United States Patent [19]
Cailliot

[11] Patent Number: 4,765,234
[45] Date of Patent: Aug. 23, 1988

[54] FRUIT AND VEGETABLE PEELER

[76] Inventor: Serge Cailliot, Carabillon, 4700 Cordey-Falaise, France

[21] Appl. No.: 877,769

[22] Filed: Jun. 24, 1986

[30] Foreign Application Priority Data

Jun. 26, 1985 [FR] France ............................ 85 09737

[51] Int. Cl.$^4$ ............................................. A23N 7/00
[52] U.S. Cl. ......................................... 99/593; 99/594; 99/597
[58] Field of Search ................. 99/540, 541, 567, 584, 99/589, 590, 593–599; 426/482, 483

[56] References Cited

U.S. PATENT DOCUMENTS

| | | | |
|---|---|---|---|
| 1,872,731 | 8/1932 | Goranson et al. | 99/593 |
| 3,113,603 | 12/1963 | Gardiner | 99/593 |
| 3,680,614 | 8/1972 | Polk, Jr. | 99/593 |
| 3,881,406 | 5/1975 | Perez | 99/599 X |
| 4,004,502 | 1/1977 | Tomelleri | 99/593 |

FOREIGN PATENT DOCUMENTS

| | | |
|---|---|---|
| 1248668 | 11/1960 | France . |
| 1481314 | 4/1967 | France . |
| 1585006 | 1/1970 | France . |
| 2037147 | 7/1980 | United Kingdom ........... 99/598 |

*Primary Examiner*—Timothy F. Simone
*Attorney, Agent, or Firm*—Fleit, Jacobson, Cohn & Price

[57] ABSTRACT

Peeler for a product (P), such as a fruit or vegetable, using a rotating tool moved in relation to the product so as to explore the surface of the latter and mark on it successive parallel turns, characterized in that the said tool is in the form of a vertical cutter (T) and comprises a part of revolution (1) of small diameter and a small number of teeth, whether cutting teeth or not, forming projections (2), this tool (T) being driven in rotation about its axis (AT) at a high speed and in such a direction (S) that the said projections (2) engage the skin of the product from below, starting from the adjacent turn already peeled.

10 Claims, 5 Drawing Sheets

FRUIT AND VEGETABLE PEELER

The invention relates to appliances intended for skinning or peeling various products, such as fruit or vegetables, that is to say removing their skin, casing or husk which hereinafter will be referred to as skin.

For the peeling of fruit, it is known to use the principle of the lathe, with one or more fixed or rotary tools which have at least one cutting part and which attempt to imitate manual peeling, that is to say detach a continuous peel, such as, for example, in the devices described in the documents FR-A-No. 1,585,006, U.S. Pat. No. 3,680,614 and FR-A-No 1,481,314. On an automatic appliance, the presence of such a continuous peel is a serious disadvantage because of its tendency to clog and impede the action of the tool. To remedy this, it is known from the document U.S. Pat. No. 3,113,603 to use a rotary knife with a cylindrical cutting edge, combined with a disc which supports the cylindrical cutting edge and which is provided with apertures sharpened in the plane of the disc, so as to cut the ribbon of peel transversely into smaller portions making it easier to discharge it. It is also known from the document FR-A-No. 1,248,668 to use a rotary knife in the form of a very flat milling cutter, having a large number of cutting teeth distributed over a considerable diameter, in order to produce small chips, the discharge of which is left to chance.

The devices described above are not suitable for the peeling of vegetables, on the one hand because of the rapid wear of the cutting edges, especially where products with a soily skin are concerned, and on the other hand because of the irregular shapes of vegetables, such as potatoes, and the differences in hardness of their flesh, such as the difference between a carrot and a potato. Consequently, grinders or abrasive devices processing the vegetables in bulk under a stream of water are preferably used, although these entail very substantial weight losses during peeling, or even, in very special cases, such as potatoes, shaving knives are used, but these are very fragile and again have the disadvantage of being clogged by the peel.

The object of the invention is to eliminate the preceding disadvantages by providing a device which, without special adaptation, is suitable for all the commonest types of fruit and vegetables, which eliminates the problem of clogging and discharge of the peelings and which also overcomes the problem of wear of the cutting edges and the difficulties attributable to irregular shapes.

The invention is based essentially on the use of a tool of the vertical-cutter type comprising:

a part of revolution of small diameter, capable of penetrating even into the concave portions of the irregular shapes, a small number of teeth, either cutting teeth or not, which project beyond this part of revolution, this number preferably being equal to two to obtain a balance, this vertical cutter being driven in rotation at a high speed, so that the tangential speed of the projections exceeds 8 m/s and is preferably in the region of 20 m/s, in order constantly to throw the detached particles of skin far away in proportion as the vertical cutter explores the surface of the product in parallel turns, and the direction of rotation of the vertical cutter being directed so that the projections engage the skin of the product from below, starting from the adjacent turn already peeled.

The characteristics of this vertical cutter, in particular its high rotational speed, are also expedient in that they only exert very low uniform forces, in particular making it possible to require only a very low drive torque for the vertical cutter by means of a separate motor with a direct drive or with a transmission, to give this vertical cutter a sensitive mounting, so that its surface of revolution bears on the surface of the product, but with only a very slight force or restoring torque if the assembly has a tilting mounting, finally, to require only a low torque to drive the product in rotation and only a low traversing force for the device intended for generating the relative movement of systematic exploration in parallel turns. In particular, the product can be driven in rotation and in translation by means of a simple spindle in the form of a corkscrew, allowing direct screwing into and unscrewing from the product using only a fraction of the travel of the same translational and rotational movements.

According to an important feature of the invention, the axle of the vertical cutter is mounted in bearings, so as to oscillate about a perpendicular pivot pin, this pivot pin itself being mounted in the bearings of a fork-shaped holder capable of rotating about an axle which is perpendicular to or even at right angles to and offset relative to the pivot pin, so that at the start of operation, the pivot pin forms an angle of approximately 45° with the spindle carrying the product, in such a direction that, when the vertical cutter meets the product, the vertical cutter automatically moves away obliquely, and at the end of operation, this pivot pin forms an angle of opposite direction and preferably approximately 20°, with this same spindle.

This arrangement is intended to ensure an automatic mode of operation and a substantially constant apparent pitch between the turns.

Further particular features of the invention will emerge from the following description of an exemplary embodiment illustrated in the attached drawing in which.

Figure 2:
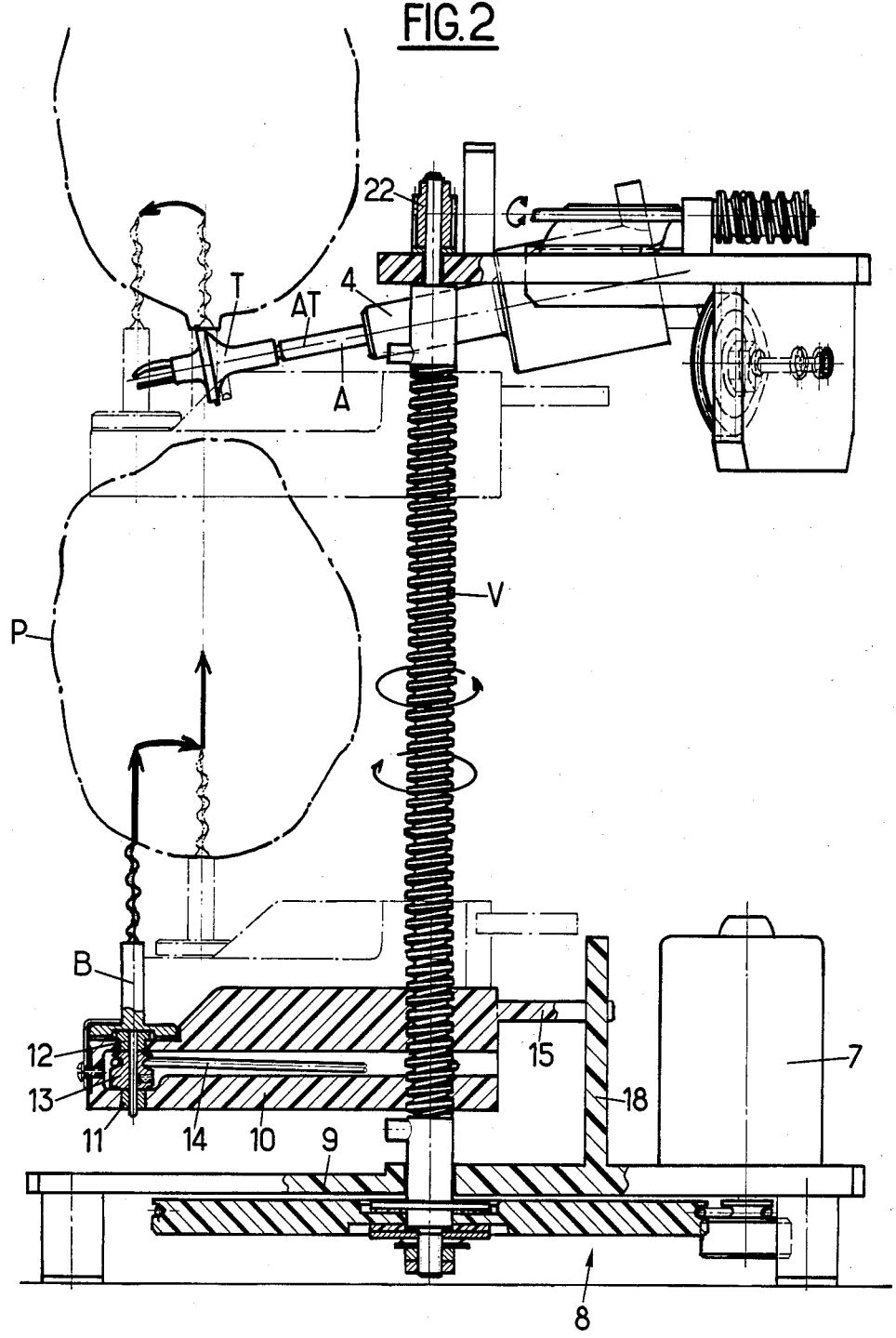
FIG. 2 is an axial cross-section along II—II of FIG. 1.
Figure 6:
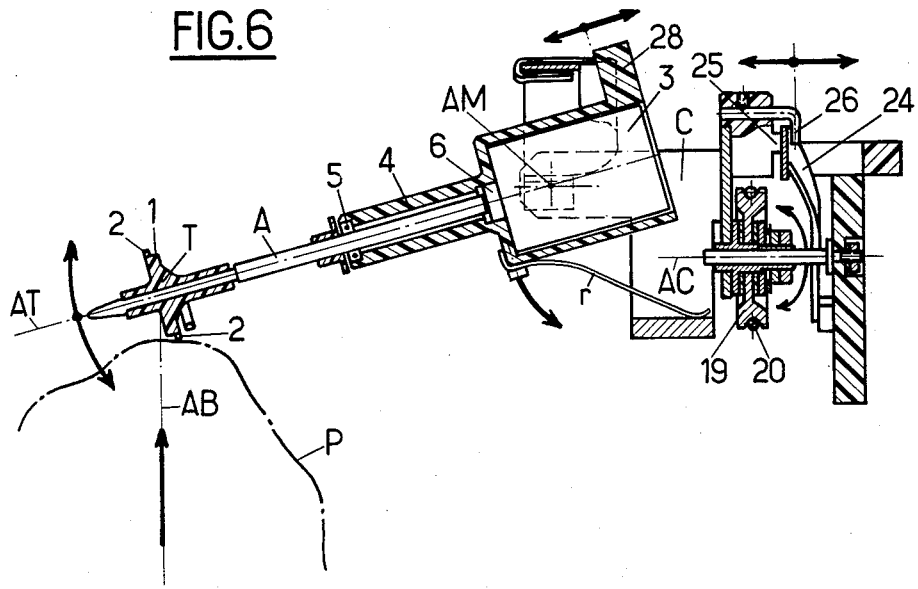
FIG. 6 is a partial horizontal section along VI—VI of FIG. 3.

FIGS. 2 and 6 in particular illustrate the vertical cutter T according to the invention, which has a surface of revolution 1, in this case cylindrical, which is capable of bearing on the surface of the product P to be peeled, so as to limit penetration, this surface having a very small diameter, for example of the order of 20 mm. Moreover, the vertical cutter has a very small number of projections 2, for example two to ensure a balance during rotation. The vertical cutter T, together with its bearing surface 1, can be made, for example, of moulded plastic, whilst the projections 2 are advantageously formed by the projecting part of a metal blade which can be sharpened or not. The amount by which each projection extends beyond the surface 1 defines the maximum depth of cut and, if appropriate, can be modified by means of several types of vertical cutter.

According to an essential characteristic of the invention, this vertical cutter rotates about its axis AT at a very high rotational speed, for example 20,000 revolutions per minute, so that the tangential speed of the projection 2 is at least of the order of 20 m/s or, at all events, higher than 8 m/s. On the other hand, this high rotational speed only requires a relatively low torque, so that it can easily be provided by means of a small direct-drive motor 3 located at the other end of the shaft A of axis AT. However, any other type of transmission, for example by means of a belt, or any other type of drive, for example by means of a turbine, could be used.

According to the invention, the assembly 4 comprising the bearings 5 and 6 of the shaft A and, if appropriate, the motor 3, as in the present case, or the receiver of the transmission, is mounted so as to oscillate about a pivot pin AM perpendicular to AT. This pivot pin AM is carried, for example, by a fork-shaped holder C which can be seen particularly in FIG. 3, 5 and 6 and which is itself mounted so as to be rotatable about an axle AC perpendicular to the motor pivot pin AM and preferably offset, that is to say not concurrent with the preceding one, as can be seen especially in FIG. 6. At the same time, a restoring torque exerted, for example, by a spring r produces a rotation of the assembly 4 about this axle, in order to generate, in the region of the vertical cutter T, a low force pressing the latter against the product P of the order of 0.3 N or at most 0.5 N. In fact, the high rotational speed of the vertical cutter does not make it necessary to exert a high pressure on the product.

The product P itself, whether a vegetable or fruit, can be driven in a helical movement, to ensure that the vertical cutter T systematically explores its surface, without the need for either a high rotational drive torque or a high translational drive force. In the example illustrated, this double driving of the product P is ensured by means of a short spindle B, the end of which is pointed and cut in the form of a large-pitch screw in the manner of a corkscrew, so that it can be screwed directly into a short length of the product corresponding to the shortest length dimension of the products being processed. In this way, the simple rotation of the spindle B on itself is sufficient to ensure that the spindle penetrates into the product P, for example momentarily immobilized by hand, and then, in a second stage, the rotational and translational drive of this product.

In the example illustrated, there is for this purpose a vertical screw V which can be seen in FIGS. 1 to 4, which is driven in slow rotation from a second motor 7 in the example shown, by means of a suitable reducing gear 8 located under the base 9 of the appliance and driving the lower end of the screw V, preferably by means of friction.

Figure 4:
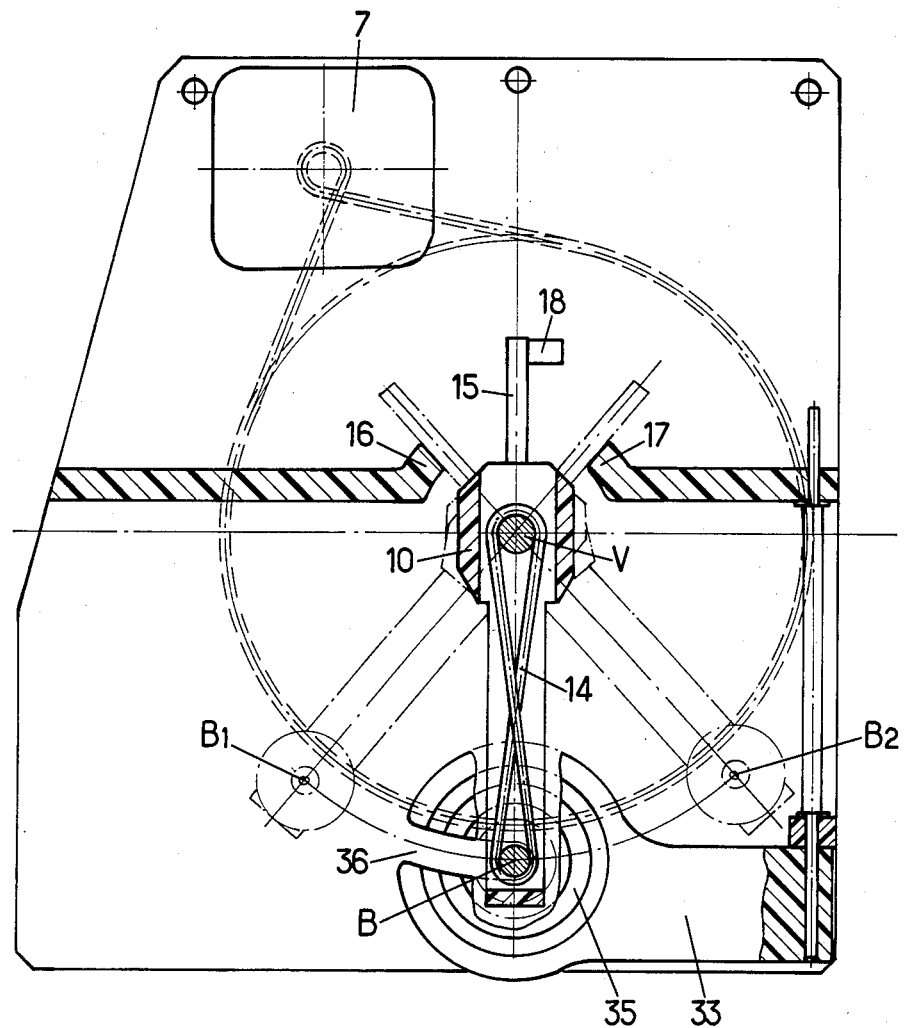
FIG. 4 is a horizontal section along IV—IV of FIG. 1.

Mounted on this screw V is a carriage 10 which can be seen particularly in FIGS. 2 and 4 and which forms a nut capable of moving in translation along the screw in one direction or the other as a result of the rotation of the latter. This carriage 10 takes the form of an arm, the end of which carries the bearings 11 and 12 of the base of the preceding spindle B. A suitable transmission makes it possible to transmit the rotational movement of the screw V to the spindle B. In the example illustrated, this transmission takes place by means of a pulley 13, keyed on the spindle B between the bearings 11 and 12, and a belt 14 passing directly between two threads of the screw V, thus ensuring both the frictional drive of the belt and its longitudinal travel under the same conditions as the carriage 10. However, any other type of transmission could be used. The transmission ratio can be equal to one or different from one.

Because of the unavoidable friction between the screw V and the carriage 10 and between the spindle B and its bearings 11 and 12, the torque of which is transferred to the screw by the belt 14, and also because of the inertia and drive resistance of the product P which opposes the movement, when the screw V is driven in rotation the carriage 10 naturally tends to rotate together with this screw rather than move in translation on the latter. To ensure this translation, the carriage 10 is therefore equipped with a rear extension 15 capable of coming up against and sliding vertically on a stop 16 integral with the appliance frame, when the screw rotates in an anti-clockwise direction as seen from above, and likewise to come up against and slide vertically on another stop 17 integral with the frame, when the screw rotates in a clockwise direction. Furthermore, in the latter case, there is also an intermediate stop 18 which, as can be seen in FIG. 2, only extends over a small portion of the height.

In particular, when the extension 15 of the carriage is up against the stop 17, with the screw rotating in a clockwise direction, the spindle B is in the position $B_1$ on the left in FIG. 4, underneath the vertical cutter T and substantially in line with the latter. The slow rotation of the screw V in the direction indicated therefore causes the upward helical advance of the product P at a pitch corresponding exactly to that of the screw V, if appropriate divided by the transmission ratio indicated above.

Figure 5:
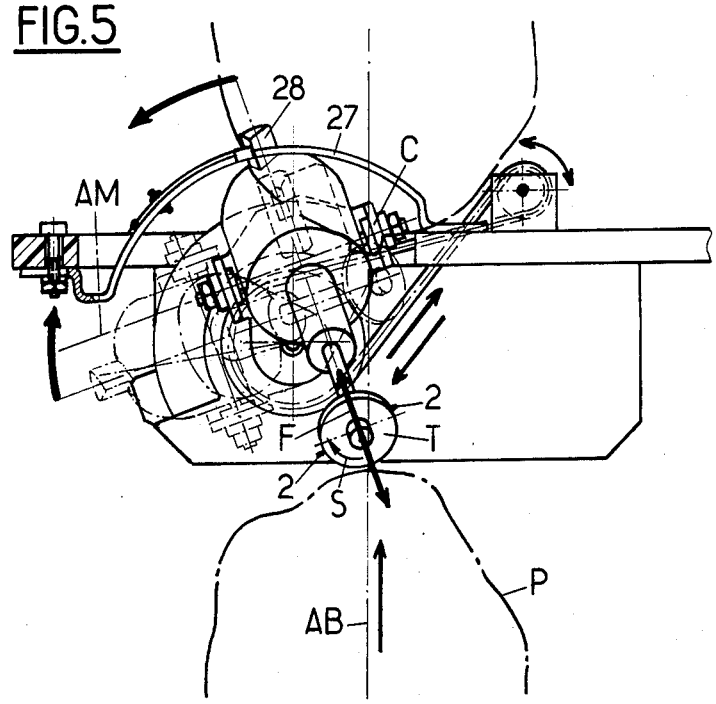
FIG. 5 is a partial horizontal view along V of FIG. 3.

At the same time, according to the invention, the holder C is positioned at the outset, in such a way that the motor pivot pin AM is inclined substantially at 45° C. relative to the axis AB of the spindle B and in such a direction that, when the vertical cutter T meets the top of the product P, the vertical cutter consequently moves away obliquely in the direction F which distances it from the axis AB, as shown in FIG. 5. Subsequently, according to the invention, the pivot pin AM is forced to rotate slowly about the holder axle AC, until it goes beyond the vertical and reaches a similar inclination in the opposite direction. However, this second inclination can stop at approximately 20 degrees relative to the vertical.

During this movement, the vertical cutter explores the entire surface of the product P, at the same time marking parallel grooves, the apparent pitch of which is substantially equal to that indicated above, the direction of rotation of the vertical cutter T, as represented by the arrow S in FIGS. 1 and 5, being selected so that the vertical cutter always engages the skin of the product P from below, starting from the preceding turn already peeled. This is especially important where soily products, such as potatoes or carrots, are concerned, to prevent undue wear of the projections 2 and to leave the peeled product P perfectly clean.

This rotational movement of the holder C about the axle AC can be generated by any suitable means, whether continuous or intermittent, but in the example illustrated, it can be obtained in a very simple way by means of a pulley 19 which drives the holder C by means of friction and which is itself driven by a belt 20 from the screw V and by means of a dual assembly consisting of a wheel 21 and a tangent screw 22, the latter being carried at the end of the screw V. The shaft 23 driven by the wheel 21 drives the belt 20 at its other end.

When the vertical cutter T engages the upper crown of the product P, it is expedient to operate at the very centre in the axis AB, whereas, when the vertical cutter finishes peeling the product P in the vicinity of the spindle B, it is expedient to shift the position of this vertical cutter relative to the axis AB of this spindle an amount just sufficient to prevent the vertical cutter from encountering the spindle B or the carriage 10. According to the invention, this can be achieved very simply by making the assembly consisting of the holder C and the pulley 19 slide along its axle AC by providing, for this purpose, an evolute cam 24 retained between a boss 25 and a finger 26 which are integral with the holder, in order to ensure, as a result of this double guidance, the progressive retraction of the assembly and its return to the initial position in the movement in the opposite direction.

Moreover, since the length of the products P can vary greatly, the moment at which the rotation of the holder C about its axle AC is to start must be delayed until the vertical cutter T actually comes into contact with the product P. To achieve this, there is a substantially cylindrical guide 27 which can be seen particularly in FIGS. 1, 3, 5 and 6 and on the edge of which bears a stop finger 28 limiting the tilting travel of the assembly 4 about the pivot pin AM. In the initial position, this finger 28 penetrates to the bottom of a slot 30 of the guide 27 and comes up against a retractable stop 31 which opposes the rotation of the holder C up to the moment when, the vertical cutter T having encountered the product and having been lifted by the latter in the direction F, the finger 28 escapes from the stop 31 which defined the initial position and begins its slow rotation as a function of the drive described.

In view of the progressive retraction of the pulley 19, as explained above, the drive pulley integral with the shaft 23 can advantageously be replaced by a portion of a helical screw 32, as in the example illustrated, but any other transmission means could of course be used. Obviously, the angular position of the holder C at the end of peeling is defined by a simple angular stop operating in the region of the cam 24 or the guide 27.

Figure 1:
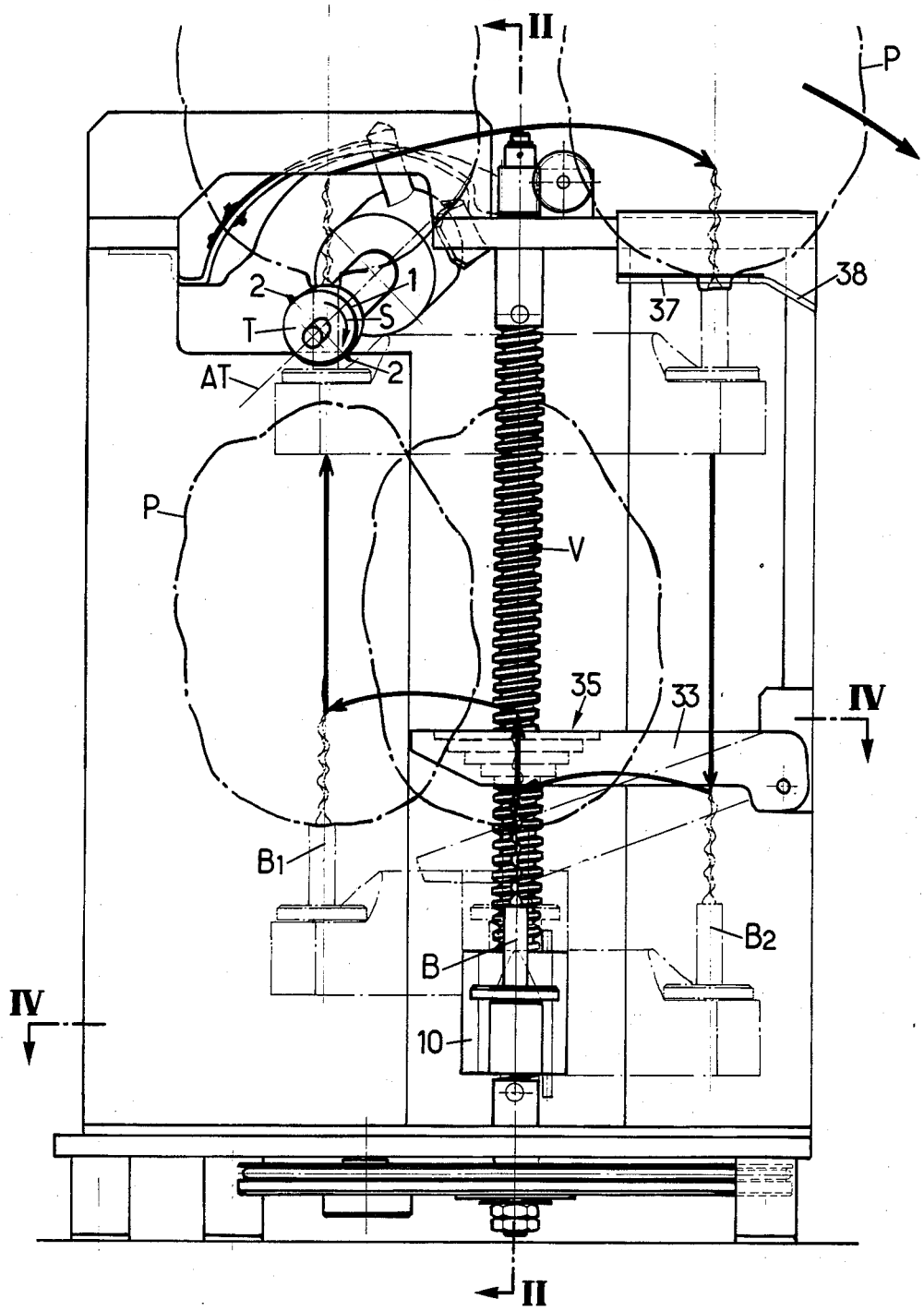
FIG. 1 is a front elevation of the essential parts of the device.

The device is advantageously completed by a centering scoop 33 which can be seen in FIGS. 1 and 4 and which is articulated about an axle 34 integral with the frame of the appliance. This scoop has a concave part 35 used for centering the base of the product in line with the spindle B when the latter is in the mid-position defined when the rear extension 15 of the carriage 10 comes up against the intermediate stop 18. It can also be seen that the scoop 33 has a releasing slot 36 allowing the passage of the base of the spindle B when the carriage 10 rotates from the mid-position to the position B₁ in FIG. 4.

The general movement of the appliance can be followed in the Figures, particularly in FIG. 1. It is assumed, at the start, that the appliance is stopped in the position represented by unbroken lines, that is to say with the carriage 10 in the mid-position and at the lower end of the travel of the screw V. The user then places a product P in the centering cavity 35 by hand and actuates a manual control which starts the motor 7. This manual control can consist simply of a contact (not shown) actuated as a result of the start of the downward movement of the scoop 33, during which the base of the product comes up against the tip of the spindle B. As a result of the rotation of the screw in a clockwise direction and because of the rear stop 18, the carriage 10 rises vertically, still in the mid-position, whilst the spindle B is driven in an anti-clockwise direction by the transmission 14 described, thus automatically causing it to rise and at the same time be screwed into the product. If the pitch of the corkscrew-part of the spindle B is substantially equal to the pitch of the screw V, taking into account the possible transmission ratio between the two axles, the spindle rises without any axial displacement of the product which is, of course, immobilized in terms of rotation by the operator's hand.

At the end of a specific travel of the carriage 10, detected by a suitable limit switch (not shown), the spindle B has been screwed over its entire length exactly, and at the same time the rear extension 15 of the carriage 10 has arrived at the upper end of the stop 18, but without escaping from the latter. The motor 7 is then stopped by means of this limit switch.

After withdrawing his hand, the operator then actuates another manual control which can consist, for example, of an additional travel of the scoop 33, and another contact restarts the motor 7, still in the same direction, for example by short-circuiting the preceding limit switch. As soon as the carriage starts to rise, its rear extension 15 then escapes from the intermediate stop 18, so that the assembly consisting of the carriage 10, spindle B and product P carried by the latter begins to rotate together with the screw, until the stop 17 comes into action, as explained above.

Subsequently, still in the course of the same movement, the product P starts its helical upward movement. At the same time, the vertical cutter T rotates in the direction indicated, but the holder C driven frictionally by the pulley 19 nevertheless remains in the stationary position, locked by the finger 28 which bears on the stop 31. After a certain number of revolutions depending on the length of the product P, the top of the latter encounters the vertical cutter T, thus causing a peeling spiral to be made on its end crown, at the same time as the release of the finger 28 allowing the subsequent slow rotation of the holder C about its axle AC, as explained above.

The product continues to rise, and the vertical cutter explores its surface, marking on it turns which change from a virtually plane spiral to virtually helical turns, terminating once again at the other end in a substantially plane spiral, all these turns having a relatively constant apparent pitch because of the progressive variation in inclination of the pivot pin AM, as indicated above. At the clination of the pivot pin AM, as indicated above. At the same time, as has been seen, the progressive retraction of the holder C makes it possible for the vertical cutter T to avoid encountering the spindle B, the latter moreover having at its base an unthreaded part of a length substantially equal to the diameter of this vertical cutter, to prevent the latter from encountering the carriage.

The vertical cutter returns to the vicinity of the axis AB according to the position of the carriage 10 corresponding to the top of its travel, this position being independent of the length of the product P and being determined by an upper limit switch (not shown).

Figure 3:
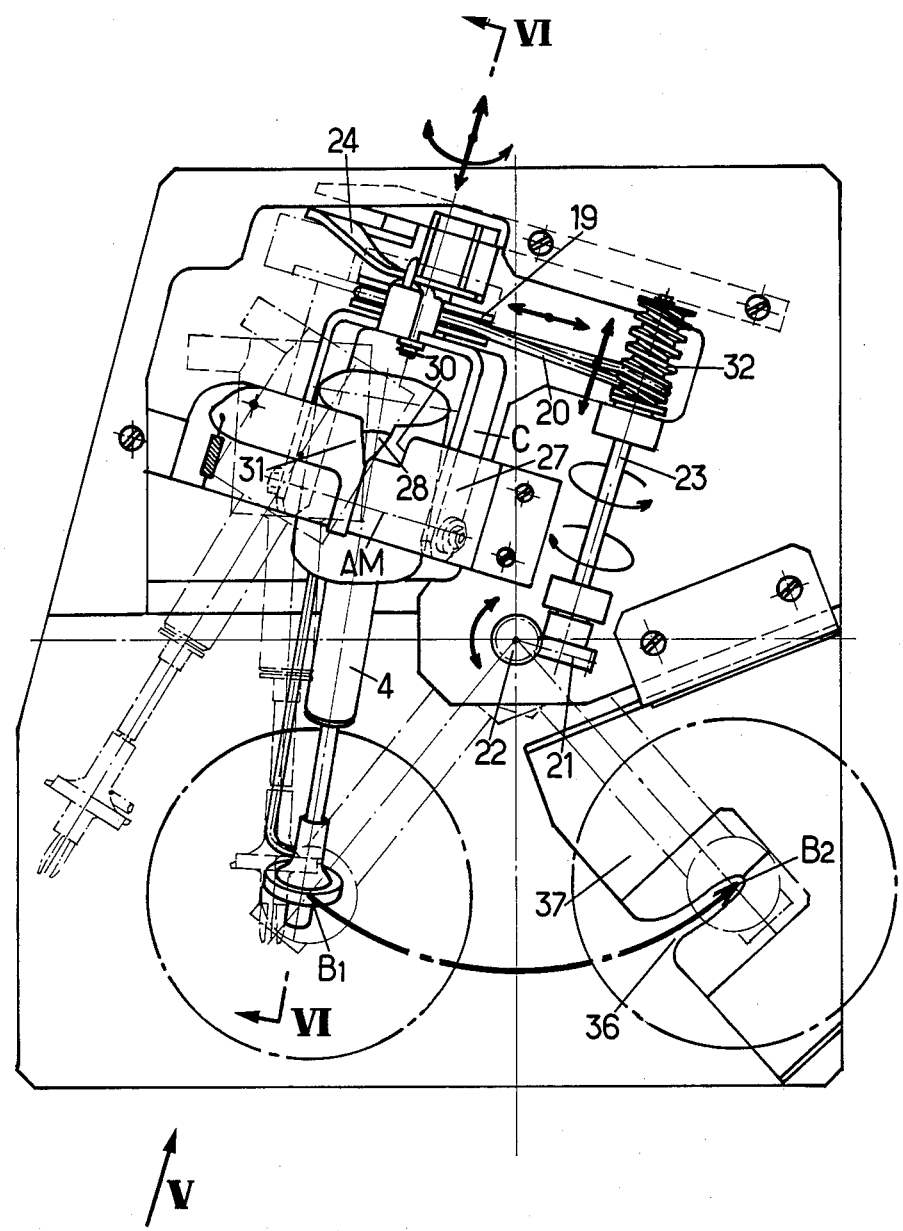
FIG. 3 is a plan view of the device.

The actuation of this limit switch simply causes the reversal of the motor 7, and, if appropriate, the motor 3 can either continue in the same direction or be stopped or run in reverse. This reversal of the direction of rotation of the screw V then causes the carriage to be driven from left to right in FIG. 1 up to the position represented by B₂ in FIG. 4. In this position, as shown in FIG. 3, the unthreaded base of the spindle B engages into the slot 36 of a discharge station consisting of a horizontal or sloping surface 37 followed by a ramp 38 or a discharge chute.

When the spindle B is in line with this new position, that is to say when the rear extension 15 of the carriage 10 encounters the first stop 16, the spindle B starts a helical downward movement in the unscrewing direction. Consequently, the product P is itself driven freely in this helical movement, until its base meets the bearing surface 37 of the discharge station. The effect of this is to immobilize it as a result of friction, thus making it possible to unscrew the spindle B which, once removed from the product P, continues its downward movement alone to the bottom end of its travel.

Here, another lower limit switch (not shown) once again causes a reversal of the running direction of the motor 7, thereby driving the carriage 10 as a whole into the mid-position B in FIG. 4, its rear extension 15 coming up against the intermediate stop 18. Another electrical contact (not shown), which detects the arrival of this rear extension 15 against the stop 18 in the low position, causes the motor 7 and, if appropriate, the motor 3 to stop, the appliance thus resuming the initial position for the start of a cycle. Of course, during this last movement, the upper tip of the spindle B just passes under the scoop 33 to take up position below the bottom of the slot 36.

In actual fact, the entire peeling cycle just described proceeds automatically and lasts scarcely 10 seconds, this time being used by the operator to take hold of another product and place it once again in the centering scoop.

During the entire peeling cycle, the particles of skin of the product P, which are finely shredded by the projections 2 of the vertical cutter T, are thrown tangentially towards a zone of reduced extent, where there is no risk at all that their accumulation will impede the running of the appliance. Of course, this zone is preferably designed in the form of a removable receptacle (not shown) allowing it to be cleaned. Conventional protective devices, which are not shown for the sake of simplification, make it possible to protect the mechanism, particularly the screw, against dirt being thrown accidentally.

In practice, the same type of vertical cutter can serve practically for most products, whether vegetables with hard flesh, such as carrots, or vegetables with soft flesh, such as potatoes, or even vegetables with tough flesh, such as turnips or onions, and also fruit with a thin skin, such as apples or pears. Because there is no need for any adaptation or any calibration of the products, it is therefore possible for the user to string together different products, for example carrots, potatoes, turnips, onions, etc. without having to change anything in the appliance. Where fruit with a thick skin is concerned, especially oranges and lemons, it is possible, as was seen above, to use a special vertical cutter, the projections 2 of which project to a greater extent. Another solution is to act on the relative speed of the vertical cutter in relation to the speed of the screw, this being particularly simple in the example described, in which there are two independent motors 3 and 7. Finally, a last solution involves restarting the peeling cycle several times on the same citrus fruit. This last solution also has the advantage that the zest of the fruit can be recovered, if desired, in the abovementioned receptacle during the first pass, whilst the pith is eliminated during the following pass or passes.

Finally, it should be noted that, despite the absence of water in the appliance, all the peeled products, whether fruit or vegetables, leave the discharge station perfectly clean because of the peeling method used and scarcely need to be cleaned at all before being used.

I claim:

1. A peeler for a product, such as a fruit or vegetable, said peeler comprising:

a rotating tool rotatable about an axis and movable in relation to the product so as to perform a cutting action on the surface of the product and mark on it successive parallel turns, said tool having a surface of revolution around said axis capable of coming into contact with the product to limit the depth of penetration of said cutting action into the product, said tool including at least one tooth, forming a projection extending radially beyond said surface of revolution to a predetermined extent in relation to said depth of penetration, said tool being driven in rotation about said axis at such a rotational speed that the tangential speed of said projection exceeds 8 m/s and in such a direction of rotation that said projection engages the skin of the product starting from an adjacent turn already peeled, a shaft of the rotating tool rotates in bearings of an assembly articulated about a perpendicular pivot pin relative to a holder which is itself movable about a holder axle perpendicular to said pivot pin so that a torque is exerted on the assembly so that the rotating tool operates sensitively, exerting on the product a force below 0.5 N and the product is driven in a relative helical movement in relation to the holder axle and said holder being driven about its axle so that at the start of a peeling cycle, the pivot pin forms with the axis of relative helical movement of the product, an initial angle in such a direction that the reaction force of the product on the rotating tool causes the rotating tool to move away obliquely so as to distance the rotating tool from said axis of relative helical movement, and that at the end of operation, said pivot pin forms with the axis of relative helical movement, a final angle in the opposite direction to the initial angle.

2. A peeler according to claim 1, wherein said initial angle is approximately 45 degrees and said final angle is approximately 20 degrees.

3. A peeler according to claim 1, wherein the product is driven in said relative helical movement by means of a short sharp-pointed and threaded spindle which penetrates one end of the product.

4. A peeler according to claim 3, wherein said spindle is located at the end of a carriage and the translational movement of said spindle being communicated by a screw which is screwed into the base of the carriage, and the rotational movement of said spindle being ensured by means of a transmission from said screw.

5. Peeler according to claim 4, wherein said spindle successively occupies three separate stations including an intermediate station for grasping the product, a peeling station in line with the rotating tool at one end, and a station for discharging the product and returning the carriage to the other end, the transfer from one of these three positions to another being obtained as a result of the effect of the rotation of the screw and the action of end stops and an intermediate stop, the action of the intermediate stop being limited to the start of the carriage travel.

6. A peeler according to claim 1, wherein the rotational movement of the holder about its holder axle is executed by means of friction and prevented by a stop finger integral with the assembly carrying the bearings of the shaft of the rotating tool and interacting with a stop, so as to allow the start of the tilting movement from the initial angular position to the final angular position only from the moment when the end of the product acting on the rotating tool has caused a sufficient movement of the assembly in an oblique moving-away direction for said stop finger to escape from its stop.

7. A peeler according to claim 6, wherein said rotational movement of the holder about its holder axle is accompanied by a retracting movement along said holder axle by means of a cam, in order to prevent interference between the rotating tool and the base of the spindle at the end of the peeling cycle.

8. A peeler according to claim 5, wherein a centering scoop is articulated relative to the frame and having a cavity centering the base of the product above the intermediate station, said scoop having a slot for lateral removal of the spindle from the intermediate station towards the peeling station.

9. A peeler according to claim 8, wherein the presence of the product on the centering scoop causes the centering scoop to tilt which, by means of suitable contacts, actuates the penetrating movement of the spindle into the product and then the stopping of the movement, a control, by means of said centering scoop, causes the cycle to continue.

10. A peeler for a product, such as a fruit or vegetable, said peeler comprising:
a rotating tool rotatable about an axis and movable in relation to the product so as to perform a cutting action on the surface of the product and mark on it successive parallel turns, said tool having a surface of revolution around said axis capable of coming into contact with the product to limit the depth of penetration of said cutting action into the product, said tool including at least one tooth, forming a projection extending radially beyond said surface of revolution to a predetermined extent in relation to said depth of penetration, said tool being driven in rotation about said axis at such a rotational speed that the tangential speed of said projection exceeds 8 m/s, and in such a direction of rotation that said projection engages the skin of the product starting from an adjacent turn already peeled, the product being driven in said relative helical movement by means of a short, sharp-pointed and threaded spindle which penetrates one end of the product, said spindle being located at the end of a carriage and the translational movement of said spindle being communicated by a screw which is screwed into the base of the carriage and the rotational movement of said spindle being ensured by means of a transmission from said screw.

* * * * *